Nov. 10, 1931.    W. COOPER    1,831,621

ANIMAL TRAP

Filed Feb. 25, 1929

INVENTOR.
WILLAM COOPER.
BY
ATTORNEY

Patented Nov. 10, 1931

1,831,621

UNITED STATES PATENT OFFICE

WILLIAM COOPER, OF APALACHIN, NEW YORK, ASSIGNOR TO COOPER HUMANE TRAP CO. INC., OF APALACHIN, NEW YORK

ANIMAL TRAP

Application filed February 25, 1929. Serial No. 342,344.

My invention relates generally to that type of trap used in holes for the taking of fur bearing animals and is an improvement on my copending application, Serial No. 263,751, filed March 22, 1928.

The principal object of my invention is to provide a new trip pan and trigger support for a trap of the character described, which is characterized by its simplicity of construction and assembly and which serves many purposes with a minimum number of parts.

Another object of my invention is to provide a trap in which the moving parts are so arranged that they act easily and freely in restricted areas, at the same time, providing by my unique construction a trap which may be set with little effort, minimizing the danger of accidental springing.

A further object of my invention is to provide a trap which is strong, durable and of unusually simple construction and operation, and very inexpensive to manufacture.

Other objects and advantages in details of construction and operation will be apparent as the description proceeds, reference now being had to the figures of the accompanying drawings wherein like reference numerals indicate like parts.

In the drawings:—

Figure 1:
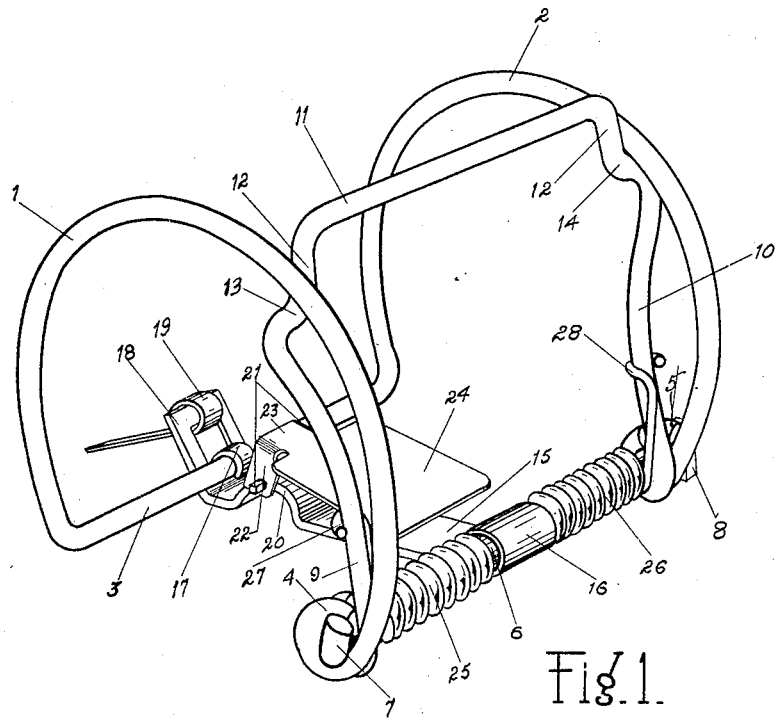
Figure 1 is a detail perspective view of the trap in sprung position.
Figure 2:
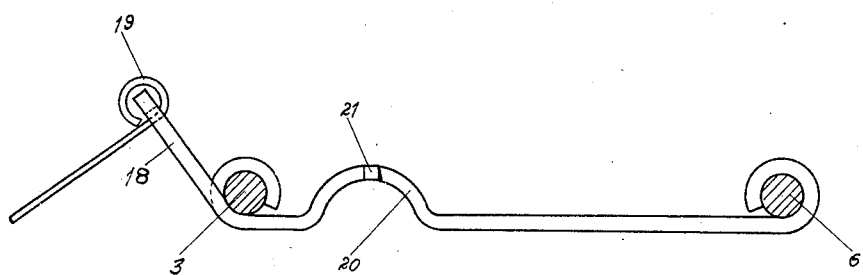
Figure 2 is a detailed side view of my improved trigger and pan support.

My improved trap consists primarily of a frame, preferably of wire, bent to form the vertical and parallel end members 1 and 2, and the horizontal side member 3, said end members taking the form of upwardly projecting loops turned inwardly at their ends 4 and 5 to form joints for a horizontal tie rod 6. Said tie rod is parallel to the side member 3 and is bent upwardly at one as at 7 to restrict its passage through the end 4 of the loop 1. The opposite end of said tie rod passes through the end 5 of the loop 2, and is threaded to receive the nut 8, thereby holding the ends 4 and 5 rigid. Pivoted on this tie rod 6, directly adjacent and just inside the ends 4 and 5, are the legs 9 and 10 of a bail, the closed portion 11 of which, when in set position, lies directly adjacent to and parallel with the side member 3. The legs 9 and 10 of the bail, in extending across the frame between the side member 4 and the tie rod 6, angle outwardly with respect to the end members 1 and 2 from their pivotal points, crossing the vertical plane of said end members 1 and 2. At points adjacent the junctures of the side member 3 with the end members 1 and 2, the legs 9 and 10 are bent inwardly past the vertical legs of the end members 1 and 2, then again are straightened out parallel with the legs 9 and 10 as at 12, crossing the side member 3 and joining with the closed portion 11 of the bail. This construction provides shoulders 13 and 14 lying in the same planes as the end members 1 and 2, respectively.

A base plate 15 is suitably secured at one end to the tie rod 6, centrally thereof as at 16, and extends directly across between the parallel tie rod 6 and side member 3 and is rigidly secured adjacent its opposite end by means of a tongue 17 struck from the base plate 15, and turned over the horizontal side member 3. The end of this base member 15 adjacent the side member 3, however, is extended beyond said side member and angles upwardly as at 18 to pivotally receive it at its upper free end, one end of a trigger arm 19 adapted to overlie both the side member 3 and the closed portion 11 of the bail. Adjacent the tongue 17 is the upturned portion 20 of the base plate 15 carrying at its upper edge and centrally thereof the lugs 21 adapted to pivotally receive the downwardly turned flanges 22, said flanges forming the lip 23 of a trip pan 24. Said lip 23 is adapted to engage the free end of the trigger arm 19.

This base member 15 comprises an important improvement in traps of this character in that it provides in a single stamped and formed piece of material, the securing means holding it to the trap proper, the pivot for the trip pan and the pivot for the trigger arm. This contributes largely to the ease of assembly and to the reduction of cost of manufacture of the trap. Likewise the independent tie rod 6 facilitates the assembly of the trap, permitting the coil springs 25 and 26 to be positioned thereon before the tie rod is mounted in the frame.

A pair of heavy coil springs 25 and 26 encircle the tie rod 6 on each side of the base member 15, each of said springs being anchored at their inner ends to the base member 15 and the opposite end of the spring 25 having bearing against the underside of the leg 9 of the bail as at 27, and the free end of the spring 26, similarly engaging the leg 10 of the bail as at 28, whereby to normally urge said bail upwardly.

It should be noted particularly that the shoulders 13 and 14 on the legs 9 and 10 of the bail, lying in the same planes as the end members 1 and 2 of the frame, prevent the bail from passing completely out of the frame under the influence of the springs 25 and 26, and providing for sufficient restriction of the space between the legs 9 and 10 of the bail and the end members 1 and 2, when the bail is sprung, to easily hold an animal caught therebetween.

The operation of my invention is as follows:—

The trapper first sets the trap by swinging the bail downwardly against tension of the springs 25 and 26 until the closed portion 11 thereof overlies the side member 3, whereupon the trigger 19 is brought over said portion 11 and the free end thereof, engaged with the lip 23 of the trip pan 24, the tension of the springs 25 and 26 on the bail tending to hold the trigger and trip pan 24 together with said trip pan in raised position. The trap may now be placed in a hole with the end members 1 and 2 in alignment with the passage therethrough, then the trap covered with leaves, twigs, etc. for concealing it. Obviously in such position, an animal entering or leaving the hole must pass through one of the looped end members 1 or 2, and over the corresponding leg 9 or 10 of the bail. By the time the animal reaches the trip pan 24, it will be clear that it will have a substantial portion of its body within the frame of the trap, and promptly upon stepping on the trip pan 24, the bail will be released to swing violently on its pivot within the planes of the frame, constricting the space between the legs 9 and 10, and the adjacent end members 1 and 2, and obviously striking, with all the force of the springs, the body of an animal in either of such positions.

Of course, changes may be made in details of construction and arrangement of parts without departing from the spirit and scope of my invention. I do not limit myself, therefore, to the particular form shown and described other than by the appended claim.

I claim:

A trap comprising a stationary frame having parallel sides and upstanding parallel open ends, a movable bail pivoted to one of said sides between said ends and extending across said frame, means normally urging said bail into engagement with said ends, a trigger for releasably holding said bail out of contact with said ends, and a base plate connecting said sides and pivotally supporting said trigger and said pan, said base plate being of one piece construction and having one end encircling one of said sides and having a tongue struck therefrom and encircling the other of said sides for attachment thereto, said plate being bent upwardly intermediate its ends and also provided with integral pivot members on the sides of said bent portion for said pan.

In testimony whereof, I affix my signature.

WILLIAM COOPER.